United States Patent
Tokiwa et al.

(10) Patent No.: US 11,529,754 B2
(45) Date of Patent: Dec. 20, 2022

(54) SKIN MATERIAL-COATED FOAMED PARTICLE MOLDED BODY

(71) Applicant: JSP CORPORATION, Tokyo (JP)

(72) Inventors: Tomoo Tokiwa, Kanuma (JP); Hiroki Kawakami, Chiba (JP)

(73) Assignee: JSP CORPORATION, Tokyo (JP)

( * ) Notice: Subject to any disclaimer, the term of this patent is extended or adjusted under 35 U.S.C. 154(b) by 649 days.

(21) Appl. No.: 16/494,255

(22) PCT Filed: Mar. 19, 2018

(86) PCT No.: PCT/JP2018/010745
§ 371 (c)(1),
(2) Date: Sep. 13, 2019

(87) PCT Pub. No.: WO2018/180678
PCT Pub. Date: Oct. 4, 2018

(65) Prior Publication Data
US 2020/0130239 A1 Apr. 30, 2020

(30) Foreign Application Priority Data
Mar. 31, 2017 (JP) .............................. JP2017-071335

(51) Int. Cl.
*B29C 44/14* (2006.01)
*B29C 44/44* (2006.01)
(Continued)

(52) U.S. Cl.
CPC ............ *B29C 44/14* (2013.01); *B29C 44/445* (2013.01); *B32B 5/245* (2013.01); *B32B 27/12* (2013.01)

(58) Field of Classification Search
None
See application file for complete search history.

(56) References Cited

U.S. PATENT DOCUMENTS

2006/0204740 A1    9/2006  Rodewyk et al.
2008/0275148 A1    11/2008 Tokiwa et al.
(Continued)

FOREIGN PATENT DOCUMENTS

EP    1 075 933 A2    2/2001
EP    1 592 554 B1    1/2008
(Continued)

OTHER PUBLICATIONS

Jan. 26, 2021 extended Search Report issued in European Patent Application No. 18774962.7.
(Continued)

*Primary Examiner* — Chinessa T. Golden
(74) *Attorney, Agent, or Firm* — Oliff PLC

(57) ABSTRACT

A skin material-coated foamed particle molded body includes a skin material made of a polypropylene-based resin molded body and a polypropylene-based resin foamed particle molded body coated with the skin material. The skin material has a multilayer structure including an inner layer adhered to the foamed particle molded body and an outer layer outside the inner layer. The outer layer contains a polypropylene-based resin and a reinforcement fiber. The inner layer contains the polypropylene-based resin and a reinforcement fiber in a lower content ratio than a content ratio of the reinforcement fiber contained in the outer layer or contains the polypropylene-based resin and substantially no reinforcement fiber. An average value of the outer layer thickness ratio to a sum of the outer and inner layer thicknesses is 0.20 or more and 0.65 or less, and a coefficient of variation Cv of the ratio is 30% or less.

9 Claims, 7 Drawing Sheets

(51) Int. Cl.
*B32B 5/24* (2006.01)
*B32B 27/12* (2006.01)

(56) References Cited

U.S. PATENT DOCUMENTS

| | | | | |
|---|---|---|---|---|
| 2011/0293914 A1* | 12/2011 | Maurer | ............ | C08J 9/36 |
| | | | | 521/146 |
| 2015/0174799 A1 | 6/2015 | Sumi | | |
| 2016/0332343 A1 | 11/2016 | Sumi | | |

FOREIGN PATENT DOCUMENTS

| | | |
|---|---|---|
| EP | 1 987 934 A2 | 11/2008 |
| EP | 2 732 953 A1 | 5/2014 |
| JP | H06-114957 A | 4/1994 |
| JP | H07-237238 A | 9/1995 |
| JP | H07-290483 A | 11/1995 |
| JP | H10-273551 A | 10/1998 |
| JP | H10-278107 A | 10/1998 |
| JP | H11-000953 A | 1/1999 |
| JP | 2004-098352 A | 4/2004 |
| JP | 2006-516937 A | 7/2006 |
| JP | 2008-273117 A | 11/2008 |
| JP | 2013-22734 A | 2/2013 |
| JP | 2016-30431 A | 3/2016 |
| JP | 2018-001493 A | 1/2018 |

OTHER PUBLICATIONS

Oct. 1, 2019 International Preliminary Report on Patentability issued in International Patent Application No. PCT/JP2018/010745.
Jun. 5, 2018 International Search Report issued in International Patent Application No. PCT/JP2018/010745.

* cited by examiner

[Fig.1]
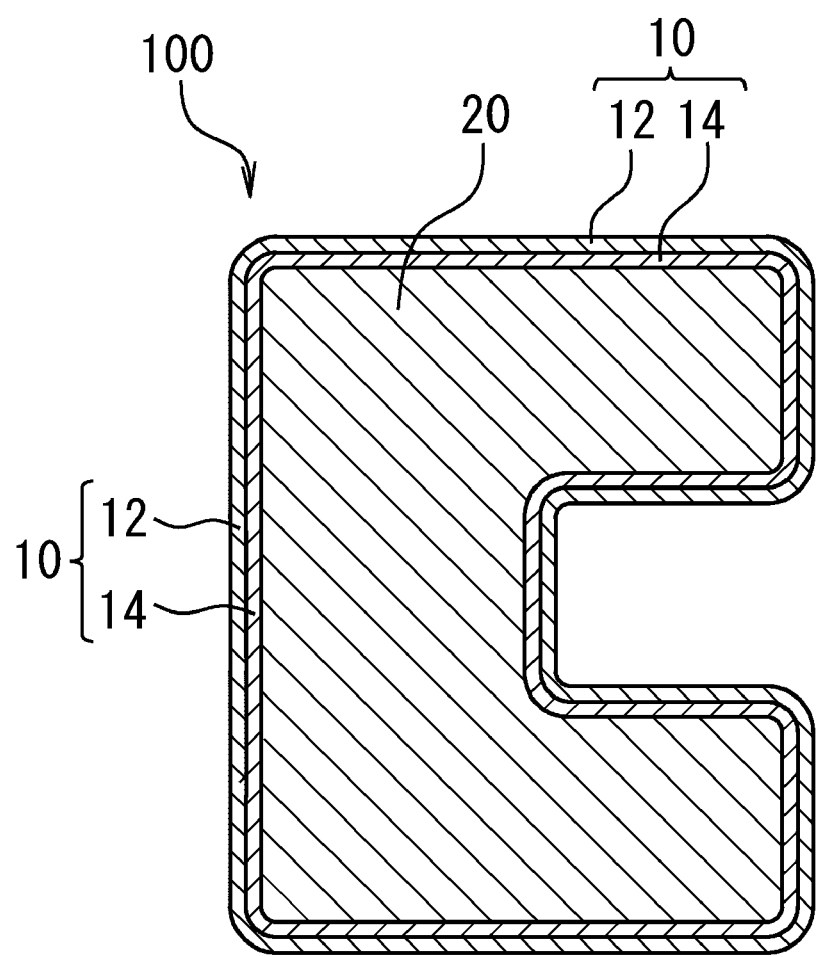

[Fig.2A]
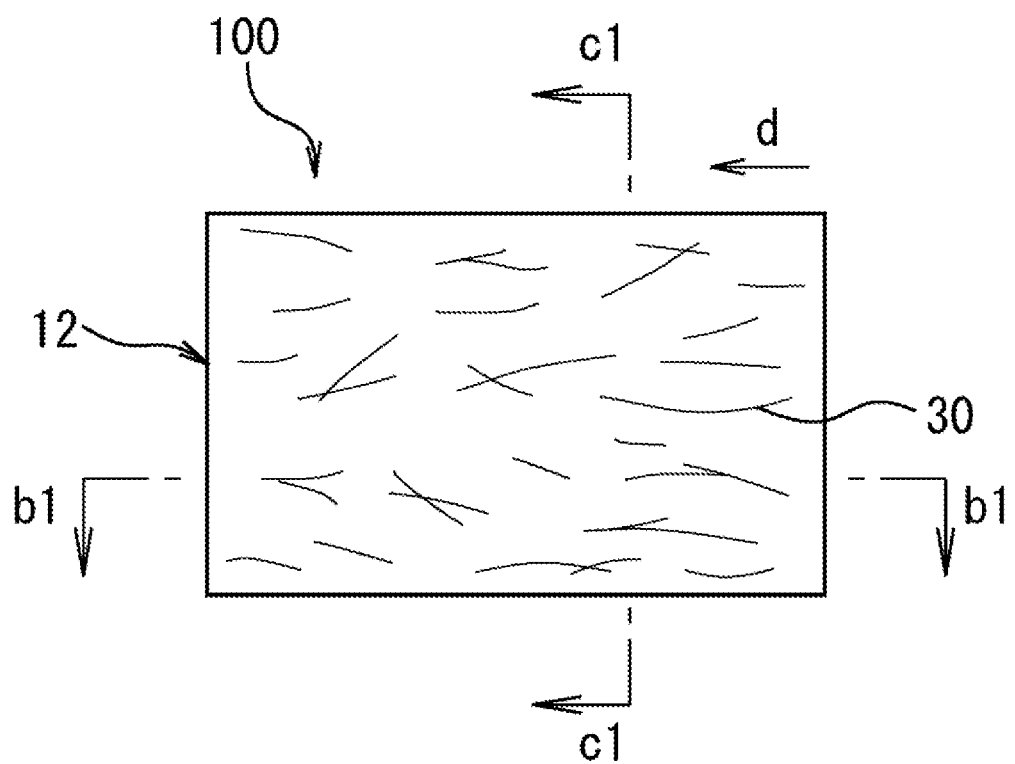

[Fig.2B]
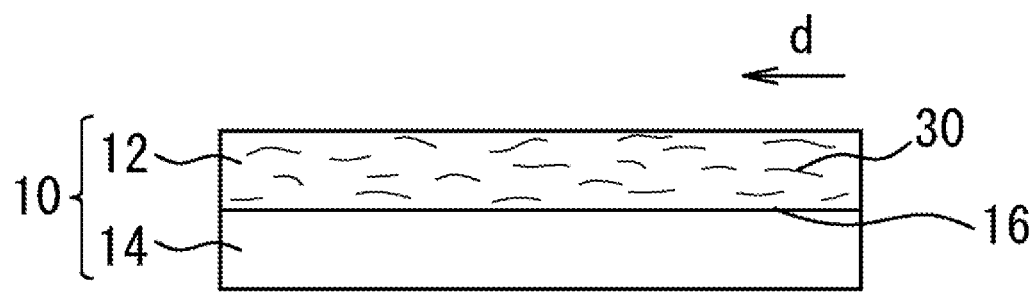

[Fig.2C]
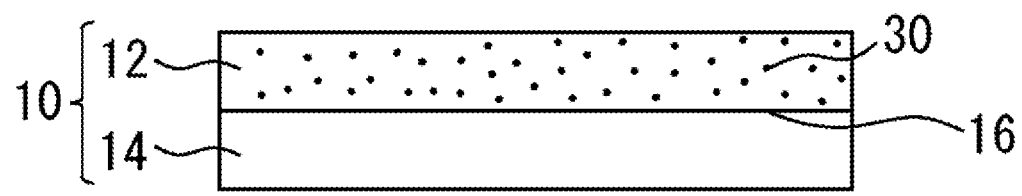

[Fig.3A]
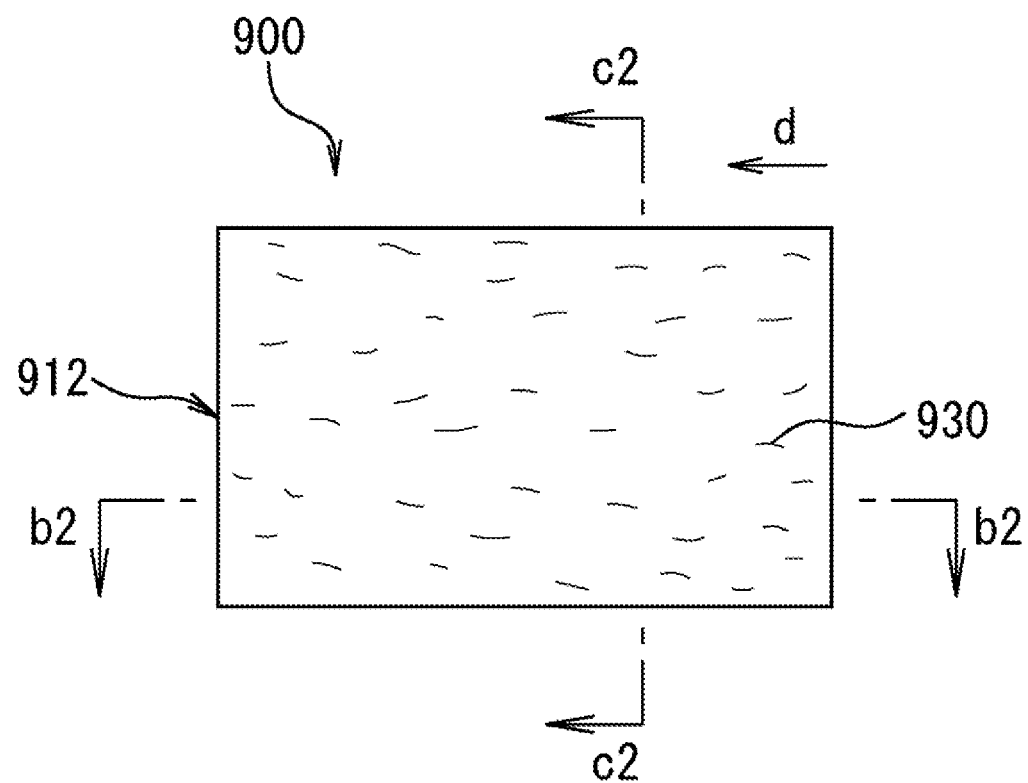

[Fig.3B]
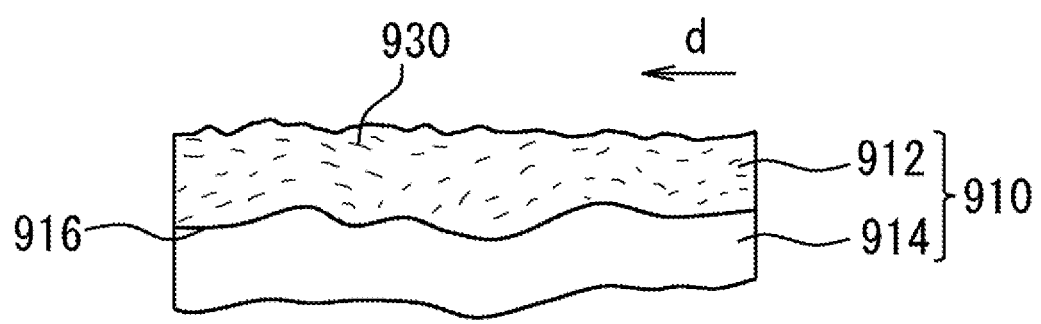

[Fig.3C]
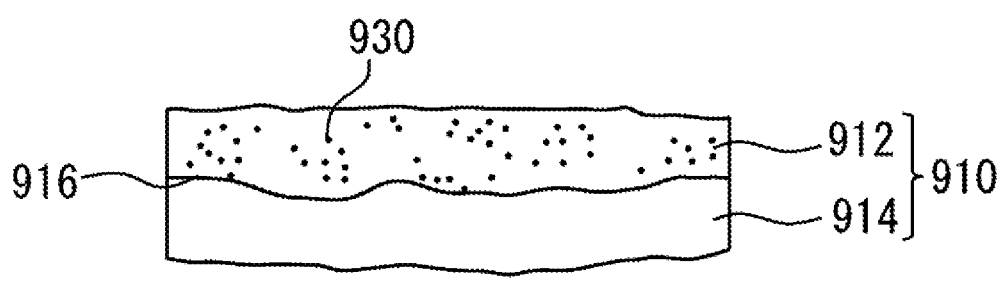

SKIN MATERIAL-COATED FOAMED PARTICLE MOLDED BODY

TECHNICAL FIELD

The present invention relates to a skin material-coated foamed particle molded body provided with a skin material.

BACKGROUND ART

Conventionally, a skin material-coated foamed particle molded body in which a hollow portion in a hollow molded body forming a skin material is filled with foamed particles, the foamed particles are fused together to form a foamed particle molded body, and also the foamed particle molded body and the skin material are integrated (hereinafter, also referred to as Prior Art 1) is known (for example, Patent Literature 1). Prior Art 1 is produced for example, as follows. First, a parison formed by extruding a melt kneaded product of a polypropylene-based resin is blow-molded in a mold die, using a forming mold for blow molding, thereby manufacturing a skin material which is a hollow blow molded body (hollow molded body). Then, a hollow portion of the hollow molded body is filled with foamed particles, the hollow portion is supplied with steam, the foamed particles are heated, thereby fusing the foamed particles together, and the foamed particles and an inner surface of the hollow molded body are fused. Thus, a skin material-coated foamed particle molded body in which the foamed particle molded body and the skin material coating the foamed particle molded body are integrated is produced.

The skin material-coated foamed particle molded body of Prior Art 1 has excellent physical properties such as flexural rigidity for being provided with a skin material, and can be formed into a complicated shape, since the skin material is manufactured by blow molding. Therefore, the skin material-coated foamed particle molded body can be used in various uses such as exterior members or interior members of vehicles, ships, or aircrafts.

Incidentally, in recent years, some suggestions have been made to improve rigidity of the foamed particle molded body by a technique different from that disclosed in Prior Art 1 described above. For example, Patent Literature 2 discloses a resin molded article formed by sandwiching a core material made of a foam between at least two resin sheets in a molten state and melting a surface of the core material, thereby welding the core material and the resin sheet (hereinafter, also referred to as Prior Art 2). The resin sheet is an extrusion-molded sheet formed by extruding a resin melt containing a fibrous filler in a T-die.

Furthermore, Patent Literature 3 discloses a fiber reinforced composite having a fiber reinforced resin layer covering a surface of a resin foam (hereinafter, also referred to as Prior Art 3). The fiber reinforced composite of Prior Art 3 is manufactured by layering a fiber reinforcement resin material containing a resin and a fiber on a surface of the previously manufactured resin foam and heating/pressing the laminate body by a thermal press or an autoclave to integrally bond the resin foamed body and the fiber reinforcement resin material.

In Prior Arts 2 and 3, an outer layer made of a fiber-containing resin sheet or a fiber reinforcement resin material (hereinafter, also referred to as a resin sheet, or the like) is layered on a surface of the foamed particle molded body to improve the rigidity of a molded article. However, these techniques have a problem in that since a resin sheet or the like is layered and welded on the surface of the previously manufactured foamed particle molded body, thermal shrinkage and a dimensional variation of the foamed particle molded body occur. Further, since a resin sheet or the like which is a planar molded product is used in the outer layer in Prior Arts 2 and 3, it was difficult to form a molded article having a complicated shape.

In contrast, Prior Art 1 has no problem of thermal shrinkage of a foamed particle molded body due to lamination of a skin material, because also integrating the foamed particle molded body and the skin material while forming the foamed particle molded body in a hollow portion of a skin material which is a hollow blow molded body. Further, since in Prior Art 1, the skin material can be formed in any shape depending on a mold, a desired molded article having a complicated shape can be provided.

CITATION LIST

Patent Literature

Patent Literature 1: JP 2008-273117 A
Patent Literature 2: JP 2013-22734 A
Patent Literature 3: JP 2016-30431 A

SUMMARY OF INVENTION

Technical Problem

The present inventors attempted higher rigidity while maintaining lightweight properties, regarding Prior Art 1 which has no problem of thermal shrinkage of the foamed molded body due to lamination of the skin material and can respond to a complicated shape, as described above.

However, in the skin material-coated foamed particle molded body, it has been found that when a fiber is contained in the skin material as in Prior Arts 2 and 3, a case in which there are appearance defects such as poor smoothness on an outer surface of the skin material, rupture of a parting line in the skin material, or occurrence of wrinkles on the outer surface of the skin material (hereinafter, also referred to as a problem of appearance defects), and a case in which an adhesive property between the skin material and the foamed particle molded body to be coated thereon is not sufficient (hereinafter, also referred to as a problem of an insufficient adhesive property). The skin material-coated foamed particle molded body is the one in which the hollow molded body forming the skin material and the foamed particle molded body are integrated. Thus, it was confirmed that a problem of appearance defects and a problem of a poor adhesive property, which would not occur if the skin material simply contains a fiber as in Prior Arts 2 and 3, can arise in the skin material-coated foamed particle molded body.

The present invention has been made in view of the above-described problems. That is, the present invention provides a skin material-coated foamed particle molded body including a skin material containing a fiber, which achieves higher rigidity while maintaining lightweight properties, and at the same time has improved problems of appearance defects and a poor adhesive property.

Solution to Problem

The skin material-coated foamed particle molded body of the present invention includes a skin material made of a polypropylene-based resin molded body and a polypropylene-based resin foamed particle molded body coated with the skin material, in which the skin material has a multilayer structure including an inner layer adhered to the polypropylene-based resin foamed particle molded body and an outer layer disposed outside the inner layer, the outer layer contains a polypropylene-based resin and a reinforcement fiber and the inner layer contains the polypropylene-based resin and the reinforcement fiber in a smaller amount than the reinforcement fiber contained in the outer layer or contains the polypropylene-based resin and substantially no reinforcement fiber, and an average value of a ratio of the thickness of the outer layer to a sum of the thickness of the outer layer and the thickness of the inner layer is 0.20 or more and 0.65 or less and a coefficient of variation Cv of the ratio is 30% or less.

Advantageous Effects of Invention

The skin material-coated foamed particle molded body of the present invention has a skin material including an outer layer containing a reinforcement fiber and an inner layer containing a reinforcement fiber in a smaller amount than the reinforcement fiber contained in the outer layer or an inner layer containing no reinforcement fiber. Further, in the skin material-coated foamed particle molded body of the present invention, the outer layer and the inner layer having a thickness ratio and a coefficient of variation in specific ranges are formed. Therefore, the skin material-coated foamed particle molded body of the present invention can achieve higher rigidity while maintaining lightweight properties, and has a good adhesive property between the skin material and the foamed particle molded body and good surface appearance.

BRIEF DESCRIPTION OF DRAWINGS

FIG. 1 is a sectional view of a skin material-coated foamed particle molded body which is an embodiment of the present invention.

FIG. 2A is a schematic diagram showing an orientation state of a reinforcement fiber in a top view of an outer layer in the skin material-coated foamed particle molded body of the present invention.

FIG. 2B is a schematic diagram showing an orientation state of a reinforcement fiber in a b1-b1 cross section cut along an extrusion direction of the skin material in the skin material-coated foamed particle molded body of the present invention shown in FIG. 2A.

FIG. 2C is a schematic diagram showing an orientation state of a reinforcement fiber in a c1-c1 cross section cut in a direction perpendicular to an extrusion direction of the skin material in the skin material-coated foamed particle molded body of the present invention shown in FIG. 2A.

FIG. 3A is a schematic diagram showing an orientation state of a reinforcement fiber in a top view of an outer layer in the skin material-coated foamed particle molded body of the comparison subject example.

FIG. 3B is a schematic diagram showing an orientation state of a reinforcement fiber in a b2-b2 cross section which is cut along an extrusion direction of the skin material in the skin material-coated foamed particle molded body of the comparison subject example shown in FIG. 3A.

FIG. 3C is a schematic diagram showing an orientation state of a reinforcement fiber in a c2-c2 cross section cut in a direction perpendicular to an extrusion direction of the skin material in the skin material-coated foamed particle molded body of the comparison subject example shown in FIG. 3A.

DESCRIPTION OF EMBODIMENTS

Hereinafter, embodiments of the skin material-coated foamed particle molded body of the present invention will be described using FIGS. 1 to 3C. FIG. 1 is a sectional view of a skin material-coated foamed particle molded body 100 which is an embodiment of the present invention. FIG. 2A to FIG. 3C will be described later. In the description of the present invention, an extrusion direction refers to, unless otherwise stated, an extrusion direction in a step of extruding a resin from a die to form a parison, when manufacturing a skin material. Further, in the present specification, a preferred numerical range of the present invention may be shown as appropriate. In this case, a preferred range, a more preferred range, and a particularly preferred range regarding the upper limit and the lower limit of the numerical range can be determined from all combinations of the upper limit and the lower limit.

First, an outline of a skin material-coated foamed particle molded body 100 (hereinafter, also simply referred to as a molded body 100) will be described. The molded body 100 of the present invention includes a skin material 10 and a polypropylene-based resin foamed particle molded body 20 (hereinafter, also simply referred to as foamed particle molded body 20), as shown in FIG. 1. The skin material 10 in the present invention is a hollow blow molded body using a polypropylene-based resin as a base resin. Further, the skin material 10 has a multilayer structure including at least an outer layer 12 and an inner layer 14. The outer layer 12 contains a polypropylene-based resin and a reinforcement fiber 30 (see FIG. 2A to FIG. 2C). Meanwhile, the inner layer 14 contains the polypropylene-based resin and a reinforcement fiber 30 in a lower content ratio than a content ratio of the reinforcement fiber 30 contained in the outer layer 12, or contains the polypropylene-based resin and no reinforcement fiber 30. FIG. 1 and FIGS. 2A to 2C illustrate the molded body 100 including the inner layer 14 containing no reinforcement fiber 30. In the molded body 100, an average value of a ratio of the thickness of the outer layer 12 to the sum (total) of the thickness of the outer layer 12 and the thickness of the inner layer 14 is 0.20 or more and 0.65 or less, and a coefficient of variation Cv of the ratio is 30% or less. In addition, the average value is an arithmetic average.

Hereinafter, the molded body 100 will be described in detail.

[Skin Material]

A skin material 10 is a polypropylene-based resin molded body having a multilayer structure and is preferably a hollow blow molded body obtained by blow-molding a parison having a multilayer structure formed by coextrusion. The multilayer structure refers to a structure including two or more layers in a thickness direction, which includes an inner layer 14 in contact with the foamed particle molded body and an outer layer 12 disposed outside the inner layer 14. The skin material 10 may have one or more intermediate layers formed between the outer layer 12 and the inner layer 14 as appropriate, or may have an optional outermost layer provided outside the outer layer 12. The skin material 10 in the present embodiment has a two-layer structure including the outer layer 12 and the inner layer 14. A reinforcement fiber may be contained in other layers such as the intermediate layer or the outermost layer, in a range not departing from the spirit of the present invention. It is preferred that each layer constituting the skin material 10 is all the layer using a polypropylene-based resin as a base resin. The resin constituting the outer layer 12 and the inner layer 14 is not particularly limited as to whether it is in a non-foamed state or a foamed state, but is preferably in a non-foamed state from a viewpoint of having higher rigidity of the molded body 100.

The thickness of the skin material 10 is not particularly limited. From a viewpoint of lightweight properties of the molded body 100, the average thickness of the skin material 10 is preferably 5 mm or less, more preferably 4 mm or less, and still more preferably 3 mm or less. Further, from a viewpoint of appropriately maintaining the rigidity of the skin material 10, the average thickness of the skin material 10 is preferably 1 mm or more and more preferably 2 mm or more.

[Outer Layer]

An outer layer 12 is a layer disposed outside an inner layer 14, when the side of a foamed particle molded body 20 of the skin material-coated foamed particle molded body 100 is inside. The outer layer 12 is formed by a polypropylene-based resin and contains a reinforcement fiber 30. The outer layer 12 in the present embodiment is disposed on the outermost side of the skin material 10. In the molded body 100, the reinforcement fiber 30 is contained in the outer layer 12, whereby higher rigidity of the entire molded body 100 can be achieved, without increasing the thickness of the skin material 10 (that is, maintaining lightweight properties).

The average thickness of the outer layer 12 is preferably 0.5 mm or more 3.0 mm or less. Within the range, higher rigidity of the molded body can be achieved, a thickness balance with the inner layer is also excellent, and a uniform skin material can be formed. From the above viewpoint, the average thickness of the outer layer 12 is more preferably 0.7 mm or more and 2.0 mm or less.

[Inner Layer]

An inner layer 14 is a layer disposed in contact with a foamed particle molded body 20. From a viewpoint of increasing a peel strength between the skin material 10 and the foamed particle molded body 20 by adhering the inner layer 14 to the foamed particle molded body 20, the inner layer 14 is disposed on the innermost side of the skin material 10 (that is, the side abutting on the foamed particle molded body 20). The inner layer 14 is formed by a polypropylene-based resin. Further, the inner layer 14 contains a reinforcement fiber 30 in a smaller amount than the content ratio of the reinforcement fiber 30 contained in the outer layer 12, or contains no reinforcement fiber 30. By having a difference in content ratios of the reinforcement fiber 30 in the outer layer 12 and the inner layer 14 as such, higher rigidity of the molded body 100 is achieved by the outer layer 12, and also, an adhesive property between the skin materials 10 or between the skin material 10 and the foamed particle molded body 20 can be improved, and a problem of appearance defects can be solved, by the inner layer 14.

In addition, the present inventors also reviewed an aspect in which the skin material is a single layer containing a reinforcement fiber. As a result, in the aspect, spreadability of the skin material is insufficient, such that the skin material is partly torn at the time of blow molding, and an adhesive property between the skin materials may be insufficient at a parting line (hereinafter, sometimes referred to as PL) portion. In this case, steam leakage occurs when forming the foamed particle molded body in the hollow blow molded body, and as a result, there is a possibility that wrinkles occur on the molded body surface and a possibility that smoothness of the molded body surface is reduced. Further, it was found that also in the aspect in which the skin material including the outer layer containing the reinforcement fiber and the inner layer containing the reinforcement fiber in the same degree as the outer layer is provided, the problem of appearance defects and the problem of adhesive property between the skin material and the foamed particle molded body may occur.

The present inventors found that the reinforcement fiber is blended in the outer layer 12, the reinforcement fiber is blended in the inner layer 14 in a smaller amount (including zero) than the amount blended in the outer layer 12, and the outer layer 12 and the inner layer 14 have a specific thickness ratio, whereby not only the problem of appearance defects and the problem of a poor adhesive property between the foamed particle and the skin material are improved, but also the molded body 100 has excellent flexural properties, and also variations in physical properties of the molded body 100 are less likely to occur.

In the present embodiment, an average of a ratio of the thickness of the outer layer 12 to the sum of the thickness of the outer layer 12 and the thickness of the inner layer 14 is 0.20 or more and 0.65 or less. Within the range, the molded body 100 has a good balance between lightweight properties and rigidity, and has excellent surface smoothness. From the above viewpoint, the ratio is preferably 0.30 or more and 0.60 or less, more preferably 0.35 or more and 0.55 or less, and still more preferably 0.38 or more and 0.50 or less. Further, within the above range, the outer layer 12 and the inner layer 14 are formed by coextrusion, whereby it is possible to form the skin material 10 having less variation in thickness. In addition, in the present embodiment, when the skin material 10 has a two-layer structure of the outer layer 12 and the inner layer 14, it is preferred that, in particular, the relation of the ratio of the average thickness is as described above. Further, even when an optional intermediate layer is included between the outer layer 12 and the inner layer 14, it is preferred that the above ratio is in the above range.

A coefficient of variation Cv of the ratio of the thickness of the outer layer 12 to the sum of the thickness of the outer layer 12 and the thickness of the inner layer 14 is 30% or less. In the present invention, in particular, since the variation in the thickness of the outer layer 12 is small, the smoothness of the molded body surface is excellent, and the appearance of the entire molded body is good. Further, the resulting molded body 100 is less likely to cause a variation in physical properties for a local loading. From the above viewpoint, the coefficient of variation Cv is preferably 25% or less, and more preferably 20% or less. As shown in FIGS. 2A to 2C, it is considered that the reinforcement fiber is contained in the outer layer 12 in a specific dispersion state, thereby suppressing a variation in the thickness of the molded body due to a spring back phenomenon which occurs when forming a multilayer parison.

The outer layer 12 and the inner layer 14 are composed of a polypropylene-based resin having the same composition or different compositions. The polypropylene-based resin refers to a resin containing a propylene component structural unit the most as a component structural unit constituting the resin, and the propylene component structural unit in the resin is preferably 50 mol % or more. Specific examples of the polypropylene-based resin include homopolypropylene (h-PP); random polypropylene (r-PP) such as a propylene-ethylene random copolymer and a propylene-ethylene-butene random copolymer; block polypropylene (b-PP); or a mixture thereof.

In addition, from a viewpoint of a fusing property between the inner layer 14 and the foamed particle molded body, the resin constituting the outer layer 12 and the inner layer 14 may be the same, but polypropylene-based resins having different melting points may be used. It is preferred that the melting point of the resin constituting the inner layer 14 is lower than the melting point of the resin constituting the outer layer 12. Further, it is preferred that a difference in melting points of the inner layer 14 and the outer layer 12 is 5° C. or more and 20° C. or less.

Next, the reinforcement fiber 30 contained in the skin material 10 will be described.

In the present embodiment, the outer layer 12 contains the reinforcement fiber 30. Further, the inner layer 14 contains the reinforcement fiber 30 in a smaller amount (including zero) than the outer layer 12, but preferably, contains no reinforcement fiber 30.

Examples of the reinforcement fiber 30 contained in the outer layer 12 include fiber materials such as glass fibers, a glass wool, carbon fibers, and cellulose nanofibers. The reinforcement fiber 30 may be one fiber material or a combination of two or more fiber materials. From a viewpoint that a carbon fiber has excellent specific strength and can impart high strength to the molded body 100 while suppressing a blending amount, the carbon fiber is preferred as the reinforcement fiber 30. The specific strength herein means a value obtained by dividing tensile strength by density.

The carbon fiber used as the reinforcement fiber 30 is a fibrous material containing carbon as a main component. Examples of the carbon fiber include a PAN-based carbon fiber, an anisotropic pitch-based carbon fiber, and the like, but are not limited thereto. The PAN-based carbon fiber is obtained by subjecting a long fiber prepared from polyacrylonitrile (PAN) to predetermined thermal treatment. The anisotropic pitch-based carbon fiber is produced from petroleum refining or a coal dry-distillation by-product. As compared with other reinforcement fiber or reinforcement materials, from a viewpoint of being capable of imparting high strength to the molded body 100 while suppressing a blending amount, a carbon fiber is suitably selected as the reinforcement fiber 30.

In a preferred aspect of the present invention, a weight average fiber length of the reinforcement fiber 30 contained in the outer layer 12 is 0.5 mm or more and 2.0 mm or less. When the weight average fiber length is in the above range, the molded body 100 further has higher rigidity and also has excellent uniformity of the average thickness of the outer layer 12, the adhesive property (peel strength) between the skin material 10 and the foamed particle molded body 20 is better, and the appearance is excellent. Even when reinforcement fiber 30 is contained in the inner layer 14, it is preferred that the weight average fiber length range of the reinforcement fiber 30 is as described above. From the above viewpoint, the weight average fiber length of the reinforcement fiber 30 contained in the outer layer 12 or the inner layer 14 is preferably 0.5 mm or more and 2.0 mm or less, more preferably 0.8 mm or more and 1.8 mm or less, and still more preferably 1.0 mm or more and 1.6 mm or less. In addition, the reinforcement fiber 30 which is to be contained in the outer layer 12 through blow molding is easily broken during the process. Therefore, the length of the reinforcement fiber 30 contained in the outer layer 12 tends to be shorter than the length of the reinforcement fiber used as a raw material. In the molded body 100, the reinforcement fiber 30 should be contained within the above range.

Here, results of comparing the molded body 100 corresponding to an exemplary embodiment of the present invention with the skin material-coated foamed particle molded body 900 which is a comparison subject example (hereinafter, also referred to as a molded body 900) in a microscopic observation will be described using FIGS. 2A to 2C, and FIGS. 3A to 3C. The microscopic observation was performed at a magnification of 100 times using a scanning electron microscope.

FIG. 2A is a schematic diagram showing an orientation state of a reinforcement fiber 30 in a top view of an outer layer 12 in the molded body 100. FIG. 2B is a schematic diagram showing an orientation state of a reinforcement fiber 30 in a b1-b1 cross section cut along an extrusion direction d of the skin material 12 in the molded body 100 shown in FIG. 2A. FIG. 2C is a schematic diagram showing an orientation state of a reinforcement fiber 30 in a c1-c1 cross section cut in a direction perpendicular to an extrusion direction d of the skin material 12 in the molded body 100 shown in FIG. 2A.

FIG. 3A is a schematic diagram showing an orientation state of a reinforcement fiber 930 in a top view of an outer layer 912 in the molded body 900 of the comparison subject example. FIG. 3B is a schematic diagram showing an orientation state of a reinforcement fiber 930 in a b2-b2 cross section which is cut along an extrusion direction d of the skin material 910 in the molded body 900 of a comparative subject shown in FIG. 3A. FIG. 3C is a schematic diagram showing an orientation state of a reinforcement fiber 930 in a c2-c2 cross section which is cut in a perpendicular direction to an extrusion direction d of the skin material 910 in the molded body 900 of a comparative subject shown in FIG. 3A. In addition, the reinforcement fiber 30 and the reinforcement fiber 930 described herein are the same material.

In the molded body 100, many points where a plurality of reinforcement fibers 30 are generally oriented along an extrusion direction d and simultaneously adjacent reinforcement fibers 30 intersect each other are observed in the top view of the outer layer 12, as shown in FIG. 2A. Since the reinforcement fibers 30 are appropriately long so that the fibers easily intersect each other in the top view, it is presumed that there are many intersections so that higher rigidity of the molded body 100 can be achieved.

Meanwhile, in the molded body 900, there were relatively few points where the reinforcement fibers 930 intersect each other in the top view observation of the outer layer 912, as shown in FIG. 3A.

Further, in the molded body 100, a plurality of reinforcement fibers 30 were generally arranged along an extrusion direction d in a b1-b1 cross section formed by cutting parallel to the extrusion direction d, as shown in FIG. 2B. In the outer layer 12, an interface 16 between the surface and the inner layer 14 was flat as compared with the molded body 900 described later, and the layer thickness was approximately even.

Meanwhile, in the molded body 900, orientation of a plurality of reinforcement fibers 930 were random as compared with the molded body 100 in a b2-b2 cross section formed by cutting parallel to the extrusion direction d, and irregularities were found on the surface and the interface 916, as shown in FIG. 3B. As a result of observation of FIGS. 2B and 3B, from a viewpoint of flattening of the interface, it was found that in the outer layer 12, the reinforcement fiber 30 having an orientation angle to the extrusion direction d of 20° or less is preferably 70% or more, and more preferably 75% or more. It is preferred that the reinforcement fiber 30 having an orientation angle of 20° or less is contained in a predetermined range, whereby flatness of the surface of the outer layer 12 and the interface 16 is better.

Further, it was observed that in the molded body 100, the cross section of the reinforcement fiber 30 was well dispersed in a c1-c1 cross section which was cut perpendicularly to the extrusion direction d of the skin material 10, as shown in FIG. 2C.

Meanwhile, in the molded body 900, a plurality of points where the cross section of the reinforcement fiber 930 gathers irregularly were observed in the c2-c2 cross section which was cut perpendicularly to the extrusion direction d of the skin material 910, as shown in FIG. 3C.

The molded body 100 relatively has a better thickness uniformity of the outer layer 12 as compared with the molded body 900. Thus, it was presumed that the thickness uniformity of the inner layer 14 was favorably affected, and as a result, a good lamination state can be realized in the outer layer 12 and the inner layer 14. As a result, it was presumed that along with the excellent appearance, a point which is a starting point where an adhesive property is locally reduced does not occur, and the molded body 100 having less variation in physical properties can be obtained.

In the above, a preferred characteristic of the molded body 100 described using FIGS. 2A to 2C, and FIGS. 3A to 3C was significantly observed particularly when the outer layer 12 containing the reinforcement fiber 30 having a weight average fiber length of 0.5 mm or more and 2.0 mm or less, is provided.

From the above observation, it was presumed that the orientation property of the reinforcement fiber 30 and the reinforcement fiber 930, and the flatness of the outer layer 12 and the outer layer 912 are closely related.

The content ratio of the reinforcement fiber 30 in the outer layer 12 is preferably 5% by mass or more and 30% by mass or less, and more preferably 8% by mass or more and 20% by mass or less, when the total mass of the outer layer 12 is 100% by mass. By having the content ratio of the reinforcement fiber 30 of 5% by mass or more, the higher rigidity of the molded body 100 can be sufficiently achieved. Further, by having the content ratio of the reinforcement fiber 30 of 30% by mass or less, when a parison extruded from a die is blow-molded, unintended rupture of the parison and formation of a hole are suppressed, and the parison is more reliably widened to fit the shape of a mold die.

When the content ratio of the reinforcement fiber 30 in the outer layer 12 is within the above range, the inner layer 14 contains the reinforcement fiber in a lower content ratio than the above content ratio or the inner layer 14 does not contain the reinforcement fiber. The content ratio of the reinforcement fiber in the inner layer 14 is preferably 0% by mass or more and less than 5% by mass, and more preferably 0% by mass or more and 3% by mass or less, when the total mass of the inner layer 14 is 100% by mass. Within the range, when a steam pin is driven into the hollow blow molded body (skin material 10), the resin constituting the inner layer 14 appropriately follows the movement of the steam pin and extends, and the resin is in the state of sealing the outer peripheral surface of the steam pin. As a result, the steam pin and the hollow blow molded body are closely adhered to each other without any gap, and the steam supplied into the hollow blow molded body is prevented from being leaking to the outside. Thus, the foamed particles filled in the hollow blow molded body, and the hollow blow molded body (that is, the skin material 10) and the foamed particle molded body 20 are more firmly adhered to each other.

It is preferred that the molded body 100 has a peel strength between the skin material 10 and the foamed particle molded body 20 of 0.3 MPa or more. The molded body of the present invention has the skin material 10 including the inner layer 14 and the outer layer 12 and the inner layer 14 has a lower content ratio of the reinforcement fiber as compared with the outer layer 12. Therefore, the skin material 10 and the foamed particle molded body 20 can be integrated better. From the above viewpoint of integration, the peel strength is more preferably 0.4 MPa or more, and still more preferably 0.5 MPa or more. Further, the molded body 100 having the peel strength in a preferred range shows a good appearance. Further, the molded body 100 having the peel strength in a preferred range has excellent bending strength, and additionally, it is difficult to produce a variation in the bending strength depending on measurement points. The upper limit of the peel strength between the skin material 10 and the foamed particle molded body 20 is not particularly limited from a viewpoint of integration of both, but for example, is 1 MPa or less.

To the polypropylene-based resin constituting the outer layer 12 and the inner layer 14, various additives are appropriately added, in addition to the reinforcement fiber 30. Examples of the additive include a conductivity imparting agent, an antioxidant, a heat stabilizer, a weathering agent, an ultraviolet ray inhibitor, a flame retardant, an inorganic filler, an antibacterial agent, an electromagnetic wave shielding agent, a gas barrier agent, an antistatic agent, a crystallization accelerator, a crystallization retarding agent, and the like.

[Polypropylene-Based Resin Foamed Particle Molded Body]

Next, the foamed particle molded body 20 provided in the skin material 10 will be described. The foamed particle molded body 20 is formed by heating the polypropylene-based resin foamed particles (hereinafter, sometimes simply referred to as foamed particles) filled in the hollow blow molded body (skin material 10) with steam. Since the resin constituting the polypropylene-based resin foamed particles is the same as the propylene-based resin which can constitute the skin material 10, detailed description will be omitted here. The propylene-based resin constituting the outer layer 12, the inner layer 14, and the foamed particle molded body 20 may be the same resin or may be the resins having different compositions, but by constituting them all with the propylene-based resin, a mutual adhesive property becomes good and higher rigidity of the molded body 100 is favorably achieved.

The fusion ratio of the foamed particle molded body 20 is preferably 40% or more, more preferably 50% or more, and still more preferably 55% or more. Within the range, the physical properties such as bending strength of the molded body 100 are likely to be in a good range. In other words, the molded body 100 includes the outer layer 12 containing the reinforcement fiber 30 and the inner layer 14 containing the reinforcement fiber 30 in a lower content than the outer layer 12. From this, it is difficult to produce a tear and an adhesion failure in the parting line of the hollow molded body, and a problem of steam leakage when molding the foamed particle molded body 20 is prevented. Then, steam spreads throughout the inside of the molded body 100 and the foamed particle molded body 20 having a fusion ratio of 40% or more is easily obtained. As a result, in addition to the excellent bending strength of the molded body 100, a variation depending on measurement points is less likely to occur.

The apparent density of the foamed particle molded body 20 is preferably 20 g/L or more and 100 g/L or less, and more preferably 30/L or more and 70 g/L or less. The apparent density of molded body 100 including the foamed particle molded body 20 having the apparent density in the above range is preferably 180 g/L or more and 500 g/L or less, and more preferably 200 g/L or more and 400 g/L or less.

The higher rigidity of the molded body 100 of the embodiment described above is achieved. It is preferred that a degree of high rigidity is such that the following physical properties in the extrusion direction are in the following range. That is, a bending modulus of elasticity is preferably 400 MPa or more, and more preferably 450 MPa or more. Further, a specific bending modulus of elasticity is preferably 0.8 MPa/g or more. Further, a bending strength is preferably 7.0 MPa or more. Further, a coefficient of variation Cs of bending strength is preferably 10% or less, and more preferably 9.5% or less. Within the range, the molded body 100 becomes a good molded body which is difficult to produce a variation in the bending strength depending on measurement points.

Further, a shrinkage rate of the molded body 100 in the extrusion direction determined from the dimension of the mold is preferably 1% or less, and more preferably 0.5% or less. The molded body 100 of the present invention has no tear at the parting line of the skin material 10 in the step of forming the foamed particle molded body, and has an excellent adhesive property between the skin material 10 and the foamed particles. Therefore, steam heating is efficiently performed in the step of forming the molded body 100, and as a result, the molded body 100 has a low shrinkage rate and an excellent dimensional accuracy.

[Method of Producing Skin Material-Coated Foamed Particle Molded Body]

Hereinafter, a preferred method of producing the skin material-coated foamed particle molded body (hereinafter, also simply referred to as a molded body) will be described. However, the following description does not limit the method of producing the molded body of the present invention at all. The method of producing the molded body can be appropriately changed in a range not departing from the spirit of the present invention.

(Skin Material Molded Body Producing Step)

It is preferred that a polypropylene-based resin molded body which is the skin material is a hollow blow molded body formed by blow-molding a parison having a multilayer structure including an inner layer and an outer layer disposed outside the inner layer which were formed by coextrusion.

Specifically, a resin melt for forming the outer layer, which is made into a molten state by supplying the polypropylene-based resin forming the outer layer and a reinforcement fiber to an extruder, and a resin melt for forming the inner layer, which is made into a molten state by supplying the polypropylene-based resin forming the inner layer to the extruder, are prepared. The reinforcement fiber may be appropriately blended in the resin melt for forming the inner layer. Then, the resin melt forming each layer of the inner layer and the outer layer are joined and layered in a die, and the laminate is coextruded from the die provided in the extruder to form a parison. By adjusting an extrusion amount of the resin melt forming each layer, the parison having a multilayer structure with a desired layer ratio is obtained. Next, the parison in a softened state is inserted into a split mold die, a blow pin is driven into the parison, pressurized gas (hereinafter, also referred to as blow air) such as compressed air is blown into the parison, and the parison is shaped by being pressed against the inner wall of the split mold die, thereby forming the hollow blow molded body. In addition, the inner layer of the parison having a multilayer structure is a layer disposed inside the parison having a multilayer structure, which is not in contact with a mold die surface, and the outer layer of the parison having a multilayer structure is a layer disposed outside the parison having a multilayer structure, which is in contact with the mold die surface. Further, in addition to the hollow blow molded body, any material which forms the skin material including the outer layer and the inner layer by thermoforming a thermoplastic polypropylene-based resin, can be applied to the skin material formed by skin mold molding, sheet blow molding, and the like, also.

(Polypropylene-Based Resin)

As the polypropylene-based resin constituting the parison, the above-described polypropylene-based resin used in the skin material-coated foamed particle molded body can be used as a resin constituting the outer layer and the inner layer.

(Reinforcement Fiber)

It is preferred that the reinforcement fiber is blended in the polypropylene-based resin constituting the outer layer. The reinforcement fiber preferably contains a carbon fiber, and more preferably, the reinforcement fiber is substantially a carbon fiber. The fiber length of the reinforcement fiber to be blended is preferably 6 mm or more and 10 mm or less. The reinforcement fiber tends to have a shorter fiber length by melt-kneading with a resin in an extruder. The melt-kneading conditions and the like at the time of extrusion may be appropriately adjusted so that the weight average fiber length of the reinforcement fiber contained in the outer layer of the molded body which is the final product is in a range of 0.5 mm or more and 2.0 mm or less.

Further, from a viewpoint of dispersibility of the reinforcement fiber in the outer layer, it is preferred to use a resin pellet which is commercially available as a long fiber carbon reinforced polypropylene, as the reinforcement fiber. As the resin pellet, it is preferred to use a PP resin-impregnated type long fiber pellet (long fiber reinforced resin pellet) formed by impregnating an appropriately long reinforcement fiber (for example, a reinforcement fiber having a length in a range of 6 mm or more and 10 mm or less) with the polypropylene-based resin. Specific examples of the long fiber carbon reinforced polypropylene include "Plastron PP-CF20" and "PP-CF40", manufactured by Daicel Polymer Ltd.

The resin-impregnated type long fiber pellet is obtained by a pultrusion molding method in which while a continuous reinforcement fiber for reinforcement (hereinafter, also referred to as a continuous fiber) is drawn, the continuous fiber is impregnated with a thermoplastic resin. For example, a resin additive is added to a polypropylene-based resin having a low melt viscosity if necessary to prepare a molten resin in a molten state. Then, the molten resin is supplied from the extruder to a crosshead die, while the continuous fiber is drawn through the crosshead die, and the continuous fiber is impregnated with the molten resin, thereby obtaining a molten resin-impregnated product. The molten resin-impregnated product is thermally cured, then cooled, and cut perpendicularly to a drawing direction, thereby capable of obtaining the resin-impregnated type long fiber pellet in which reinforcement fibers having a length equivalent to the longitudinal direction of a pellet are arranged in the longitudinal direction (drawing direction).

The above-described pultrusion molding is basically a method in which the resin is impregnated into a fiber bundle for reinforcement while a continuous fiber bundle for reinforcement is drawn. Examples of the pultrusion molding include an embodiment in which a fiber bundle is passed through and impregnated into an impregnation bath containing an emulsion, a suspension, or a solution of resin, and an embodiment in which resin powder is blown in a fiber bundle, or a fiber bundle is passed through a tank having the powder to attach the fiber powder to the fiber, and then the resin is melted and impregnated, in addition to the above-described embodiment using a crosshead die. As a constituent material of the outer layer, the resin-impregnated type long fiber pellet manufactured by these embodiments can be used. A pellet obtained by the above-described crosshead method using the crosshead die is particularly preferred.

According to the review of the present inventors, in a step of forming the hollow blow molded body using a reinforced polypropylene-based resin material containing a reinforcement fiber, when the resin-impregnated type long fiber pellet is used, it is difficult for problems such as occurrence of a spring back phenomenon in a parison in a soften state to occur. Therefore, in the above embodiment, it was found that it is easy to form the outer layer and the inner layer which satisfy the specific ratio and coefficient of variation in the present invention.

Further, when the resin-impregnated type long fiber pellet is used as the polypropylene-based resin of the outer layer, in particular, the orientation state of the reinforcement fiber constituting the outer layer is good. Thus, in the molded body of the present invention, the skin material having a multilayer structure having a specific relation is formed, and higher rigidity can be achieved while maintaining the lightweight properties. Further, the molded body of the present invention having a good appearance is easily realized.

In addition, the content ratio of the reinforcement fiber in the resin-impregnated type long fiber pellet is preferably 3% by mass or more and less than 60% by mass, based on the sum of the mass (100% by mass) of the polypropylene-based resin and the reinforcement fiber.

From a viewpoint of suppressing breakage of the pellet and fluffing of the fiber, it is preferred that the resin-impregnated type long fiber pellet consists of an acid group-containing polyolefin-based resin (for example, maleic acid-modified polypropylene) and a reinforcement fiber surface-treated with a sizing agent having a functional group capable of reacting with an acid group.

Examples of a raw material of the carbon fiber which is surface-treated with the sizing agent include carbon fibers such as a polyacrylonitrile (PAN-based), pitch-based, or rayon-based carbon fiber, and among them, a PAN-based carbon fiber is preferred.

(Steam Pin Driving Step)

In a mold die, a hollow blow molded body is driven with a steam pin of which the inside is a hollow tubular body. A wall portion of the hollow blow molded body is punched out by the steam pin advanced from a predetermined location, and the steam pin is inserted into the inside in a predetermined length. The steam pin driving step is carried out at an appropriate timing after a hollow blow molding step and before carrying out a steam supply step. For example, it is preferred that the steam pin driving step is carried out before a foamed particle filling step.

(Foamed Particle Filling Step)

Before cooling and solidifying the hollow blow molded body, the hollow blow molded body is filled with the polypropylene-based resin foamed particles. The foamed particles can be appropriately produced by a known method. Filling of the foamed particles is carried out by driving a foamed particle filling pipe (filling feeder) which is connected to an air supply pipe from the outside to the inside of the hollow blow molded body, and supplying foamed particles with force-feeding air from an air supply pipe through the foamed particle filling pipe.

(Steam Supply Step)

After carrying out the foamed particle filling step, a steam supply step is carried out. In the present step, steam in a heated state is supplied into the hollow blow molded body via the steam pin. A vapor pressure of the steam is preferably 0.15 MPa (G) or more and 0.6 MPa (G) or less. By heating with the steam, foamed particles are fused together to form the foamed particle molded body, and the inner surface (inner surface of the inner layer) of the hollow blow molded body and the foamed particle molded body are fused. A heating medium other than the steam such as heated air may be used in combination with the steam. After supplying the steam, the mold is cooled and the molded body is taken out by opening the mold die.

EXAMPLES

Examples and the Comparative Examples of the present invention were carried out as follows. In addition, the following four types were prepared as constituent raw materials of the skin material (outer layer and inner layer), and were used, respectively, in each of the Examples and the Comparative Examples. In the Examples and the Comparative Examples, a carbon fiber was used as the reinforcement fiber.

(Raw Material A)

A long fiber carbon reinforced polypropylene resin which is a resin-impregnated type long fiber pellet (manufactured by Daicel Polymer Ltd., product name: Plastron CF, grade: PP-CF40-11 (L8), a density of 1.12 g/cm$^3$, an amount of PAN-based carbon fiber 40 wt %, a fiber length of 8 mm, melt viscosity: 1820 Pa·s (230° C., 100 sec$^{-1}$), melting point 164° C.)

(Raw Material B)

A long fiber carbon reinforced polypropylene resin which is a core-sheath type pellet (manufactured by Toray Industries, Inc., product name: TORAYCA, grade: TLP8169, density 1.06 g/cm$^3$, an amount of PAN-based carbon fiber 30 wt %, fiber length 7 mm, melting point 164° C.)

(Raw Material C)

Polypropylene resin [manufactured by Japan Polypropylene Corporation, product name: Novatec PP, grade: EC9, density 0.90 g/cm$^3$, melting viscosity: 1200 Pa·s (230° C., 100 sec$^{-1}$), melting point 162° C. (JIS K7121-1987), block PP]

(Raw Material D)

Polypropylene resin [manufactured by Japan Polypropylene Corporation, product name: Novatec PP, grade: EG8B, density 0.90 g/cm$^3$, melting viscosity: 1070 Pa·s (230° C., 100 sec$^{-1}$), melting point 145° C. (JIS K7121-1987), random PP]

Methods of measuring various physical properties, dimension, and the like of the molded body 100 as described above, and the Examples and the Comparative Examples as described later are as follows. In addition, a longitudinal direction refers to an extrusion direction of the parison, in the various measurements described later.

(Peel Strength MPa Between Skin Material 10 and Foamed Particle Molded Body 20)

A specimen having a rectangular parallelepiped shape (50 mm×50 mm×25 mm) which was cut from the molded body 100 and had the skin material 10 on both surfaces was manufactured. An adhesive was applied to the upper and lower surfaces (surfaces of the skin material 10) of the specimen and a jig for measuring a peel strength was adhered thereto. A tensile test was performed at a tensile speed of 2 mm/min with Tensilon (universal tester). A measured maximum point stress was taken as a peel strength (MPa). As the universal tester, RTC-1250A manufactured by ORIENTEC Co., Ltd was used.

(Thickness of Skin Material 10)

In a cross section perpendicular to the longitudinal directions of total three points (provided that a special shape part of the molded body 100 is avoided) which were selected from longitudinal directions central portions and both longitudinal directions end portions of the molded body 100, the thickness of the skin material 10 was measured. Specifically, the thicknesses of the skin materials 10 at six points selected at equal intervals along the circumferential direction of the skin material 10 were measured, for the vertical cross section at three points. The obtained values of the thickness at 18 points were arithmetically averaged, and the value obtained therefrom was the thickness (average thickness) of the skin material 10.

(Thicknesses of Outer Layer 12 and Inner Layer 14)

First, a vertical cross section with respect to the longitudinal direction was cut out at a total of six points selected at equal intervals in the longitudinal direction of the molded body 100. For the vertical cross sections at six points, the thicknesses of the outer layer 12 and the inner layer 14 at six points selected substantially at equal intervals along the circumferential direction of the skin material 10 of each vertical cross section were measured with an electron microscope (scanning electron microscope, magnification: 100 times), thereby measuring the thicknesses of total 36 points. Further, the ratio of the thickness of the outer layer 12 to the sum of the thickness of the outer layer 12 and the thickness of the inner layer 14, the average value thereof, and the coefficient of variation Cv of the ratio were calculated from the measured value of the thickness of the outer layer 12 and the measured value of the thickness of the inner layer 14 at each points.

(Weight Average Fiber Length of Reinforcement Fiber 30)

The skin material 10 including the outer layer 12 was cut out from the molded body 100. The cut-out skin material was boiled with decahydronaphthalene to melt the polypropylene-based resin constituting the skin material 10. Thereafter, the melt was filtered to collect a carbon fiber which was the reinforcement fiber 30, and dried in a petri dish. An image of the reinforcement fiber 30 was photographed by using a microscope to enlarge the image by 50 times or more and 100 times or less. 100 reinforcement fibers 30 were randomly selected from the image, and the lengths thereof were measured. The measured values (mm) (the second decimal place is the significant digit) were used to calculate the weight average fiber length based on the following Equation 1.

[Equation 1]

Weight average fiber length $Lw = \Sigma(N_i \times L_i^2)/\Sigma(N_i \times L_i)$  (Formula 1)

$L_i$: fiber length of each fiber, $N_i$: number of fibers (Orientation Angle of Reinforcement Fiber 30)

First, the molded body 100 was cut along the extrusion direction d, thereby cutting out cross sections of the skin material parallel to the extrusion direction at 10 points. Each of the cross sections was observed with an electron microscope (scanning electron microscope, magnification 100 times), and 100 reinforcement fibers 30 were randomly selected per the cross section. The angle between each of the selected reinforcement fibers and the extrusion direction d was measured, and the ratio of the reinforcement fibers having the angle within ±20° was calculated.

(Melting Point of Resin)

The melting point of the resin constituting the outer layer 12 or the inner layer 14 is a value determined by a heat flux differential scanning calorimeter, based on JIS K7121-1987. Details of the measurement conditions were based on JIS K7121-1987, 3. conditions of state adjustment of specimen (2) (provided that a cooling rate is 10° C./min). A melting peak was obtained by raising the temperature at 10° C./min, using the specimen of which the state was adjusted by the above conditions. The temperature at the top of the obtained melting peak was taken as the melting point. In addition, when two or more melting peaks occurred, the temperature at the top of the melting peak which had the largest area was taken as the melting point.

(Fusion Ratio % of Foamed Particle Molded Body 20)

A dimension of 100=×100=×(a thickness of the molded body excluding the skin material 10) was cut out from 5 points (provided that excluding a plate central portion and four corners (R portion)) randomly selected in the molded body 100 so that the skin material 10 was not included, thereby manufacturing five specimens. The specimen was broken, 100 foamed particles were randomly selected on the broken surface, and the state of the particles was visually observed. The number of foamed particles that were the broken material and the number of foamed particles peeled off from the particle interface were measured. Then, a ratio of the number of foamed particles that were the broken material to the total measured number (that is, 100) was calculated and represented as percentage (%). The minimum value among the percentages obtained in each of the specimens was taken as the fusion ratio %.

(Apparent Density of Foamed Particle Molded Body 20)

A mass (g) of the specimen which was cut out from the points randomly selected in the molded body 100 so that the skin material 10 was not included was divided by a volume (L) determined from the outer dimensions of the specimen to determine the apparent density (g/L) of the foamed particle molded body 20.

(Apparent Density of Molded Body 100)

A mass (g) of the molded body 100 was divided by a volume (L) of the molded body 100 which was determined by a submersion method to determine the apparent density (g/L) of the molded body 100.

(Bending Modulus of Elasticity MPa and Specific Bending Modulus of Elasticity MPa/g in Extrusion Direction d of Molded Body 100)

A bending modulus of elasticity MPa in extrusion direction d of molded body 100 was measured based on JIS K7171: 1994. Specifically, a specimen having a dimension of 80 mm in length×10 mm in width×(a thickness of the molded body including the skin material 10) was cutout from 36 points randomly selected in the molded body 100, without removing the skin material 10. The longitudinal direction of the specimen is the same as the extrusion direction. Using the specimen, the bending modulus of elasticity MPa was measured by a three-point bending test in the extrusion direction d with an autograph tester (manufactured by Shimadzu Corporation). Further, a value of the bending modulus of elasticity MPa measured as described above was divided by the weight of the specimen, thereby calculating the specific bending modulus of elasticity MPa/g.

(Bending Strength MPa and Coefficient of Variation Cs in Extrusion Direction d of Molded Body 100)

36 strip-shaped specimens having a dimension of 80 mm in length×10 mm in width×(a thickness of the molded body including the skin material 10) were cut out from 36 points randomly selected in the molded body 100, without removing the skin material 10. The longitudinal direction of the specimen is the same as the extrusion direction. According to JIS K7221-2 (2006), the bending strength of the specimen was measured, under the conditions of a distance between supporting points: 64 mm, a pressure wedge speed: 20 mm/min, a test temperature: 23° C., test humidity: 50% (relative humidity). The arithmetic average value of each of the measured values was taken as the bending strength MPa in extrusion direction d of molded body 100.

The coefficient of variation Cs of the bending strength MPa is a percentage of the value obtained by dividing the standard deviation of the bending strength (MPa) of 36 specimens by the above arithmetic average value.

(Shrinkage Rate % of Extrusion Direction of Molded Body 100)

The dimensions of 10 molded bodies in the longitudinal direction were measured, and the shrinkage rate to the dimension of the mold (mold die) in the longitudinal direction was determined as a percentage. The arithmetic average value of ratios of shrinkage obtained in each specimen was determined, which was taken as the shrinkage rate in the extrusion direction.

Example 1

Raw material A and raw material C were dry-blended in an extruder for an outer layer having an inner diameter of 65 mm (L/D=28) so that a blending amount of a carbon fiber was 20 wt %, heated to 230° C., and kneaded to prepare a resin melt for forming an outer layer.

Raw material C was supplied to an extruder for an inner layer having an inner diameter of 65 mm (L/D=28), heated to 210° C., and kneaded to prepare a resin melt for forming an inner layer.

Next, each of the resin melts was filled in an accumulator which was attached to the extruder and adjusted to 225° C. so that a layer ratio of the outer layer to the inner layer was 1:1. Next, the resin melt was coextruded from a multilayer die at an instantaneous discharge of 600 kg/h so that the outer layer to the inner layer was 1:1, and a multilayer parison in a softened state was formed between split flat molds of 350 mm in length, 260 mm in width, and 25 mm in thickness disposed directly under the multilayer die. The injection speed was adjusted so that the completion of the injection of the outer layer and the inner layer was at the same timing. Next, the mold was mold-clamped, the temperature of the mold was adjusted to 60° C., then the multilayer parison was driven with a blow pin, and pressurized air (blow air) of 0.50 MPa (G) was blown into the parison from the blow pin. Thus, a hollow blow molded body having a thickness of 2.5 mm reflecting the shape of the mold cavity was formed. In addition, as the mold, an apparatus for producing a skin material-coated foamed particle molded body provided with a blow pin, a filling feeder (a diameter of 20 mmφ), and a steam pin (a diameter of 8 mmφ) was used.

Next, 8 steam pins were inserted into the hollow blow molded body in a softened state, gas in the hollow blow molded body was exhausted from the slit provided in a peripheral wall portion of the steam pin to adjust the pressure inside the hollow blow molded body to 0.15 MPa, and then the hollow blow molded body was filled with the foamed particles. The filling with the foamed particles was carried out by a filling feeder driven into the hollow blow molded body. As the foamed particles, propylene-ethylene random copolymer foamed particles (a melting point of 145° C., an ethylene content of 2.5% by mass, an apparent density of 56 kg/m³, and an average particle diameter of 2.8 mm) were used.

After filling the molded body with the foamed particles, while internal steam is suctioned from four steam pins (steam pin A group) out of eight steam pins inserted into the hollow blow molded body, 0.32 MPa (G) of steam was supplied for 8 seconds from the other four steam pins (steam pin B group). Next, internal steam was exhausted from the steam pin B group, and 0.32 MPa (G) of steam was supplied from the steam pin A group to the inside for 6 seconds. Next, 0.32 MPa (G) of steam was supplied from the entire steam pins to the inside for 5 seconds and the foamed particles were heated-fused together, and also the inner surface of the hollow blow molded body and the foamed particles (a foamed particle molded body composed of foamed particles) were fused.

Thereafter, the mold was cooled, the steam pin was pulled out, and then the mold was opened to obtain the intended skin material-coated foamed particle molded body.

Example 2

A skin material-coated foamed particle molded body was obtained in the same manner as in Example 1, except that the carbon fiber blending amount of the outer layer was changed to 10 wt %.

Example 3

A skin material-coated foamed particle molded body was obtained in the same manner as in Example 1, except that the carbon fiber blending amount of the outer layer was changed to 10 wt % and the raw material of the inner layer was changed to raw material D.

Example 4

A skin material-coated foamed particle molded body was obtained in the same manner as in Example 1, except that as the raw material of the outer layer, raw material D was used instead of raw material C, raw material A and raw material D were dry-blended to adjust the carbon fiber blending amount to 10 wt %, and the raw material of the inner layer was changed to raw material D.

Example 5

A skin material-coated foamed particle molded body was obtained in the same manner as in Example 4, except that the producing conditions were changed as shown in Table 1.

Example 6

A skin material-coated foamed particle molded body was obtained in the same manner as in Example 4, except that the raw material of the outer layer was melt-kneaded with a twin-screw extruder to produce a resin pellet, which was used as the raw material.

Comparative Example 1

A skin material-coated foamed particle molded body was obtained in the same manner as in Example 1, except that raw material B and raw material C were dry-blended so that a blending amount of a carbon fiber was 20 wt %, heated to 230° C., and kneaded to prepare a resin melt for forming an outer layer.

Comparative Example 2

A skin material-coated foamed particle molded body was obtained in the same manner as in Comparative Example 1, except that the carbon fiber blending amount of the outer layer was adjusted to 10 wt %, raw material D was used as the raw material of the inner layer, and the skin material blending ratio was changed as shown in Table 1.

Comparative Example 3

A skin material-coated foamed particle molded body was obtained in the same manner as in Example 1, except that the outer layer was formed only with raw material C and the inner layer was not provided.

Comparative Example 4

A skin material-coated foamed particle molded body was obtained in the same manner as in Example 1, except that the carbon fiber blending amount of the outer layer was adjusted to 10 wt % and the inner layer was not provided.

For each Example and Comparative Example obtained as described above, a total mass (g), an apparent density (g/L) of a foamed particle molded body, an apparent density (g/L) of a skin material-coated foamed particle molded body, a weight average fiber length (mm) of carbon fibers contained in an outer layer, and a ratio (%) of carbon fibers having a fiber orientation angle of 20° or less contained in an outer layer, were measured, and are shown in Table 2. Each measurement method was carried out with appropriate reference to the measurement methods as described above.

In each of the Examples and the Comparative Examples, the appearance was observed, evaluation was performed as follows, and the results are shown in Table 2.

(Evaluation of Skin Material Parting Line (PL) Tear)

The outer surface of the skin material-coated foamed particle molded body (in particular in the vicinity of the joint of the mold) was visually observed, and evaluation as to whether there was a tear of the parting line in the outer surface (outer layer surface) of the skin material, was performed as follows.

No tear was found . . . no

Tear was found . . . yes (Evaluation of Wrinkle on Outer Surface of Skin Material)

The outer surface of the skin material-coated foamed particle molded body was visually observed, and evaluation as to whether there was a wrinkle formed on the outer surface (outer layer surface) of the skin material, was performed as follows.

No wrinkle was found . . . ○

Wrinkles were found and appearance defects occurred . . . x (Evaluation of Surface Smoothness)

Measurement was performed for the surface material at a total of five points of a plate central portion and four corner portions (excluding R portion) of the foamed molded article having the skin material obtained as a specimen for measuring a surface roughness. As the measurement apparatus, SE 1700a of SURFCORDER manufactured by Kosaka Laboratory Ltd. was used. A specimen was allowed to stand on a horizontal table, a tip of a probe having a radius of curvature of tip of 2 μm was abutted on the surface of the specimen, the specimen was moved at 0.5 mm/s in the extrusion direction, and the vertical displacement of the probe was sequentially measured to measure the surface roughness value. A measurement length specified by a movement distance of the specimen was set as a predetermined length three or more times a cutoff value. In addition, the cut-off value was 8 mm, and the other parameters conform to the definition of JIS B0601 (2001), the maximum height roughness Rz (μm) of the roughness curvilinear element was determined.

Rz is 15 μm or less . . . ⊙

Rz is more than 15 μm and 50 μm or less . . . ○

Rz is more than 50 μm . . . x

In each of the Examples and the Comparative Examples, the following evaluation of physical properties was performed, and the results are shown in Table 2.

A peel strength (MPa) between the skin material and the foamed particle molded body, a fusion ratio (%) of the foamed particles constituting the foamed particle molded body, a skin average thickness (mm), an average thickness of the outer layer (mm), a ratio (Q) of the thickness of the outer layer to the sum of the thickness of the outer layer and the thickness of the inner layer, a coefficient of variation Cv of the ratio (Q), and as the physical properties of the skin material-coated foamed particle molded body in the extrusion direction, a shrinkage rate (%), a bending modulus of elasticity (MPa), a specific bending modulus of elasticity (MPa/g), bending strength (MPa), and a coefficient of variation Cs of bending strength were measured. The measurement method was carried out with appropriate reference to the measurement methods as described above.

As shown in Table 2, it was confirmed that in the Examples, the appearance was all good, the physical properties were also high, and desired higher rigidity is achieved. In addition, in Example 6 using a twin-screw extruder, the carbon fiber contained in the outer layer was more sufficiently melt-kneaded than Example 4. Therefore, in Example 6, breakage of the fiber is progressing and the weight average fiber length of the molded body was short. When Example 6 is compared with Example 4, the coefficient of variation Cv of the ratio (Q) of the thickness of the outer layer to the sum of the thickness of the outer layer and the thickness of the inner layer was small, and improved physical properties were shown.

Meanwhile, since Comparative Examples 1 and 2 have the skin material having two layer structure and the carbon fiber blended in the outer layer, higher rigidity equivalent to the Examples was achieved, in the bending modulus of elasticity, the specific bending modulus of elasticity, and the bending strength. However, Comparative Examples 1 and 2 used a core-sheath type pellet as the long fiber carbon reinforced polypropylene resin, the coefficient of variation Cv of the ratio (Q) of the thickness of the outer layer to the sum of the thickness of the outer layer and the thickness of the inner layer was high, and the appearance was poor. The coefficient of variation Cv of Comparative Example 1 was significantly higher than the Examples. Thus, it was presumed that Comparative Example 1 had non-uniform layer thicknesses of the outer layer and the inner layer. Thus, it is considered that in Comparative Example 1, the steam pin was not properly inserted into the hollow blow molded body during the producing step and steam leakage occurred to cause heating unevenness. Therefore, it is considered that the fusion ratio was low, surface wrinkles occurred, and a decrease in smoothness was observed.

Comparative Example 3 substantially had the skin material which is a single layer, and since no carbon fiber was blended in the skin material, the appearance was good but higher rigidity was not achieved.

Comparative Example 4 substantially had the skin material which is a single layer, and since the carbon fiber is blended in the skin material, higher rigidity was achieved, but appearance evaluation was poor.

TABLE 1

| | | | Example 1 | Example 2 | Example 3 | Example 4 | Example 5 | Example 6 |
|---|---|---|---|---|---|---|---|---|
| Producing conditions | Outer layer | Long fiber reinforced polypropylene-based resin | A | A | A | A | A | A |
| | | Polypropylene-based resin | C | C | C | D | D | D |
| | | Outer layer raw material mass ratio | A:C = 1:1 | A:C = 1:3 | A:C = 1:3 | A:D = 1:3 | A:D = 1:3 | A:D = 1:3 |
| | | Carbon fiber blending amount of outer layer (% by mass) | 20 | 10 | 10 | 10 | 10 | 10 |
| | Inner layer | Inner layer raw material | C | C | D | D | D | D |
| | | Skin blending ratio (outer layer:inner layer) | 1:1 | 1:1 | 1:1 | 1:1 | 0.5:1 | 1:1 |
| | | Skin discharge ratio (outer layer:inner layer) | 1:1 | 1:1 | 1:1 | 1:1 | 0.5:1 | 1:1 |

| | | | Comparative Example 1 | Comparative Example 2 | Comparative Example 3 | Comparative Example 4 |
|---|---|---|---|---|---|---|
| Producing conditions | Outer layer | Long fiber reinforced polypropylene-based resin | B | B | — | A |
| | | Polypropylene-based resin | C | C | C | C |
| | | Outer layer raw material mass ratio | B:C = 2:1 | B:C = 1:2 | — | A:C = 1:3 |
| | | Carbon fiber blending amount of outer layer (% by mass) | 20 | 10 | — | 10 |
| | Inner layer | Inner layer raw material | C | D | — | — |
| | | Skin blending ratio (outer layer:inner layer) | 1:1 | 2:3 | — | — |
| | | Skin discharge ratio (outer layer:inner layer) | 3:1 | 1:1 | — | — |

TABLE 2

| | | Example 1 | Example 2 | Example 3 | Example 4 | Example 5 | Example 6 |
|---|---|---|---|---|---|---|---|
| Molded body | Skin average thickness (mm) | 2.5 | 2.5 | 2.5 | 2.5 | 2.5 | 2.5 |
| | Average thickness (mm) of outer layer | 1.2 | 1.1 | 1.1 | 1.2 | 0.98 | 1.2 |
| | Ratio (Q) of thickness of outer layer to sum of thickness of outer layer and thickness of inner layer | 0.48 | 0.44 | 0.44 | 0.48 | 0.39 | 0.48 |
| | Coefficient Cv of variation Q | 21 | 17 | 17 | 15 | 15 | 3.5 |
| | Weight average fiber length (mm) | 1.47 | 1.39 | 1.39 | 1.43 | 1.45 | 0.60 |
| | Fiber orientation angle of 20° or less (%) | 75 | 80 | 81 | 84 | 87 | 89 |
| | Peel strength (Mpa) | 0.33 | 0.33 | 0.51 | 0.51 | 0.51 | 0.53 |
| | Apparent density (g/L) of foamed particle molded body | 42 | 42 | 42 | 42 | 42 | 42 |
| | Fusion ratio (%) | 60 | 60 | 60 | 60 | 60 | 60 |
| | Total mass of molded body (g) | 570 | 550 | 550 | 550 | 540 | 550 |
| | Apparent density of molded body (g/L) | 251 | 242 | 242 | 242 | 237 | 242 |
| | Shrinkage rate (%) | 0.4 | 0.4 | 0.4 | 0.4 | 0.4 | 0.4 |
| Physical properties | Bending modulus of elasticity (Mpa) | 620 | 450 | 490 | 490 | 470 | 510 |
| | Specific bending modulus of elasticity (MPa/g) | 1.1 | 0.82 | 0.89 | 0.89 | 0.87 | 0.93 |
| | Bending strength (Mpa) | 8.9 | 7.7 | 8.1 | 7.9 | 7.5 | 8.4 |
| | Coefficient of variation Cs of bending strength | 9.4 | 7.6 | 7.6 | 7.3 | 6.5 | 3 |
| Appearance observation | Skin PL tear | No | No | No | No | No | No |
| | Skin outer surface wrinkle | ○ | ○ | ○ | ○ | ○ | ○ |
| | Surface smoothness | ○ | ○ | ○ | ○ | ○ | ○ |

| | | Comparative Example 1 | Comparative Example 2 | Comparative Example 3 | Comparative Example 4 |
|---|---|---|---|---|---|
| Molded body | Skin average thickness (mm) | 2.5 | 2.5 | 2.5 | 2.5 |
| | Average thickness (mm) of outer layer | 1.7 | 1.3 | — | — |
| | Ratio (Q) of thickness of outer layer to sum of thickness of outer layer and thickness of inner layer | 0.68 | 0.52 | — | — |
| | Coefficient Cv of variation Q | 46 | 41 | — | — |
| | Weight average fiber length (mm) | 1.01 | 0.92 | — | 1.4 |

TABLE 2-continued

|  |  |  |  |  |  |
|---|---|---|---|---|---|
|  | Fiber orientation angle of 20° or less (%) | 58 | 63 | — | 80 |
|  | Peel strength (Mpa) | 0.18 | 0.23 | 0.25 | 0.17 |
|  | Apparent density (g/L) of foamed particle molded body | 42 | 42 | 42 | 42 |
|  | Fusion ratio (%) | 20 | 30 | 60 | 35 |
|  | Total mass of molded body (g) | 580 | 550 | 540 | 570 |
|  | Apparent density of molded body (g/L) | 255 | 242 | 237 | 251 |
|  | Shrinkage rate (%) | 0.3 | 0.4 | 1.2 | 0.4 |
| Physical properties | Bending modulus of elasticity (Mpa) | 620 | 470 | 310 | 680 |
|  | Specific bending modulus of elasticity (MPa/g) | 1.1 | 0.85 | 0.57 | 1.3 |
|  | Bending strength (Mpa) | 9.4 | 8.7 | 6.4 | 11 |
|  | Coefficient of variation Cs of bending strength | 19 | 16 | 1.8 | 12 |
| Appearance observation | Skin PL tear | Yes | Yes | No | Yes |
|  | Skin outer surface wrinkle | x | x | ○ | x |
|  | Surface smoothness | x | x | ○ | ○ |

*The shrinkage rate, the bending modulus of elasticity, the specific bending modulus of elasticity, the bending strength, and the coefficient of variation Cs of bending strength in the evaluation of physical all show the physical properties of the skin material-coated foamed particle molded body in the extrusion direction.

The above embodiments include the following technical ideas.

(1) A skin material-coated foamed particle molded body including: a skin material made of a polypropylene-based resin molded body and a polypropylene-based resin foamed particle molded body coated with the skin material, wherein the skin material has a multilayer structure including an inner layer adhered to the polypropylene-based resin foamed particle molded body and an outer layer disposed outside the inner layer, the outer layer contains a polypropylene-based resin and a reinforcement fiber, the inner layer contains the polypropylene-based resin and a reinforcement fiber in a lower content ratio than a content ratio of the reinforcement fiber contained in the outer layer or contains the polypropylene-based resin and no reinforcement fiber, and an average value of a ratio of a thickness of the outer layer to a sum of a thickness of the outer layer and a thickness of the inner layer is 0.20 or more and 0.65 or less, and a coefficient of variation Cv of the ratio is 30% or less.

(2) The skin material-coated foamed particle molded body according to (1), wherein an average thickness of the skin material is 1 mm or more and 5 mm or less.

(3) The skin material-coated foamed particle molded body according to (1) or (2), wherein a weight average fiber length of the reinforcement fiber contained in the outer layer is 0.5 mm or more and 2.0 mm or less.

(4) The skin material-coated foamed particle molded body according to any one of (1) to (3), wherein a fusion ratio of the polypropylene-based resin foamed particle molded body is 40% or more.

(5) The skin material-coated foamed particle molded body according to any one of (1) to (4), wherein the content ratio of the reinforcement fiber in the outer layer is 5% by mass or more and 30% by mass or less, and a content ratio of the reinforcement fiber in the inner layer is 0% by mass or more and less than 5% by mass.

(6) The skin material-coated foamed particle molded body according to any one of (1) to (5), wherein a peel strength between the skin material and the polypropylene-based resin foamed particle molded body is 0.3 MPa.

(7) The skin material-coated foamed particle molded body according to any one of (1) to (6), wherein the reinforcement fiber is a carbon fiber.

(8) The skin material-coated foamed particle molded body according to any one of (1) to (7), wherein the polypropylene-based resin molded body is a hollow blow molded body formed by blow-molding a parison having a multilayer structure including an inner layer and an outer layer disposed outside the inner layer which were formed by coextrusion.

(9) The skin material-coated foamed particle molded body according to any one of (1) to (8), wherein an apparent density of the skin material-coated foamed particle molded body is 180 g/L or more and 500 g/L or less.

This application claims the benefit of Japanese Patent Application No. 2017-071335, filed on Mar. 31, 2017, which is hereby incorporated by reference herein in its entirety.

REFERENCE SIGNS LIST

10, 910 Skin material
12, 912 Outer layer
14, 914 Inner layer
16, 916 Interface
Polypropylene-based resin foamed particle molded body
30, 930 Reinforcement fiber
100, 900 Skin material-coated foamed particle molded body

The invention claimed is:

1. A skin material-coated foamed particle molded body comprising:
   a skin material made of a polypropylene-based resin molded body and
   a polypropylene-based resin foamed particle molded body coated with the skin material, wherein
      the skin material has a multilayer structure including an inner layer adhered to the polypropylene-based resin foamed particle molded body and an outer layer disposed outside the inner layer,
      the outer layer comprises a polypropylene-based resin and a reinforcement fiber,
      the inner layer comprises either
         a polypropylene-based resin and a reinforcement fiber, wherein the polypropylene-based resin of the inner layer is a same composition or a different composition from the polypropylene-based resin of the outer layer, and wherein the inner layer contains the reinforcement fiber in a lower content ratio than a content ratio of the reinforcement fiber contained in the outer layer, or
         a polypropylene-based resin and no reinforcement fiber, wherein the polypropylene-based resin of the inner layer is a same composition or a different composition from the polypropylene-based resin of the outer layer, the content ratio of the reinforcement fiber in the outer layer is 5% by mass or more and 30% by mass or less and the content ratio of the reinforcement fiber in the inner layer is 0% by mass or more and less than 5% by mass, and an average value of a ratio of a thickness of the outer layer to a sum of a thickness of the outer layer and a thickness of the inner layer is 0.20 or more and 0.65 or less, and a coefficient of variation Cv of the ratio is 30% or less.

2. The skin material-coated foamed particle molded body according to claim 1, wherein an average thickness of the skin material is 1 mm or more and 5 mm or less.

3. The skin material-coated foamed particle molded body according to claim 1, wherein a weight average fiber length of the reinforcement fiber contained in the outer layer is 0.5 mm or more and 2.0 mm or less.

4. The skin material-coated foamed particle molded body according to claim 1, wherein a fusion ratio of the polypropylene-based resin foamed particle molded body is 40% or more.

5. The skin material-coated foamed particle molded body according to claim 1, wherein a peel strength between the skin material and the polypropylene-based resin foamed particle molded body is 0.3 MPa or more.

6. The skin material-coated foamed particle molded body according to claim 1, wherein the reinforcement fiber is a carbon fiber.

7. The skin material-coated foamed particle molded body according to claim 1, wherein the polypropylene-based resin molded body is a hollow blow molded body formed by blow-molding a parison having a multilayer structure including an inner layer and an outer layer disposed outside the inner layer which were formed by coextrusion.

8. The skin material-coated foamed particle molded body according to claim 1, wherein an apparent density of the skin material-coated foamed particle molded body is 180 g/L or more and 500 g/L or less.

9. The skin material-coated foamed particle molded body according to claim 1, wherein the skin material is a hollow blow molded body.

* * * * *